United States Patent [19]

Osgood

[11] Patent Number: 5,134,001
[45] Date of Patent: Jul. 28, 1992

[54] LIMINATED MULTILAYER FILM COMPOSITE AND HEAT SEALED BAG MADE THEREFROM

[75] Inventor: W. Robert Osgood, Farmington, N.Y.

[73] Assignee: Mobil Oil Corporation, Fairfax, Va.

[21] Appl. No.: 563,645

[22] Filed: Aug. 7, 1990

[51] Int. Cl.$^5$ ............... B32B 7/10; B65D 30/14
[52] U.S. Cl. .................... 428/35.2; 428/192; 428/195; 428/200; 428/204; 383/109; 383/116; 383/123; 426/127
[58] Field of Search ........ 428/35.2, 195, 200, 428/198, 204, 205, 192; 383/109, 116, 123; 426/127

[56] References Cited

U.S. PATENT DOCUMENTS

| | | | |
|---|---|---|---|
| 3,408,218 | 10/1968 | Muylwijk | 428/195 |
| 3,817,821 | 6/1974 | Gallini | 426/127 |
| 4,063,641 | 12/1977 | Kuehn | 428/204 |
| 4,101,701 | 7/1978 | Gordon | 428/192 |
| 4,235,365 | 11/1980 | Yoshii | 428/35.2 |
| 4,246,307 | 1/1981 | Trautwein | 428/198 |
| 4,337,862 | 7/1982 | Suter | 426/127 |
| 4,389,436 | 6/1983 | Weiner | 428/35.2 |

Primary Examiner—Ellis P. Robinson
Assistant Examiner—Rena L. Dye
Attorney, Agent, or Firm—Alexander J. McKillon; Charles J. Speciale

[57] ABSTRACT

An adhesively laminated composite plastic film comprising at least two layers of preformed plastic film adhered together by means of an adhesive material disposed therebetween but having preselected areas which contain neither the adhesive nor anything else which is incompatible with said plastic is disposed between the layers of plastic film or on the surfaces thereof. The composite is quite usable for forming into plastic bags by either folding the composite film upon itself and heat sealing the meeting edges, or by superposing the composite film with at least one other plastic film, which may itself be a composite film, and then heat sealing the meeting edges. The preselected areas which are devoid of adhesive correspond to the heat seal areas.

4 Claims, 3 Drawing Sheets

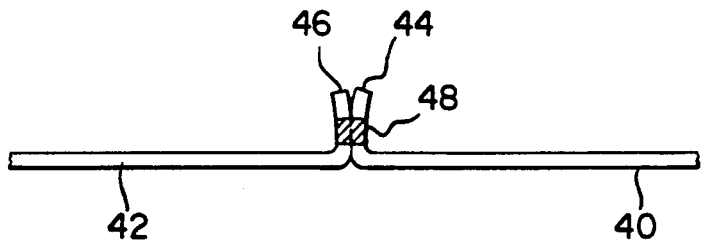
FIG. 3
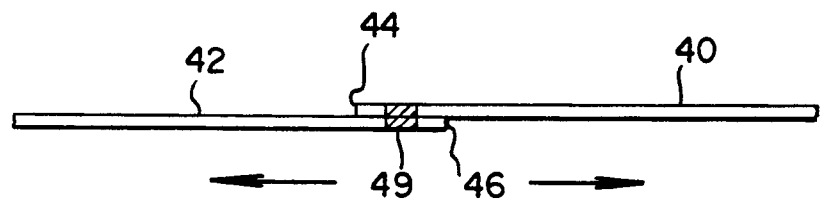
FIG. 4
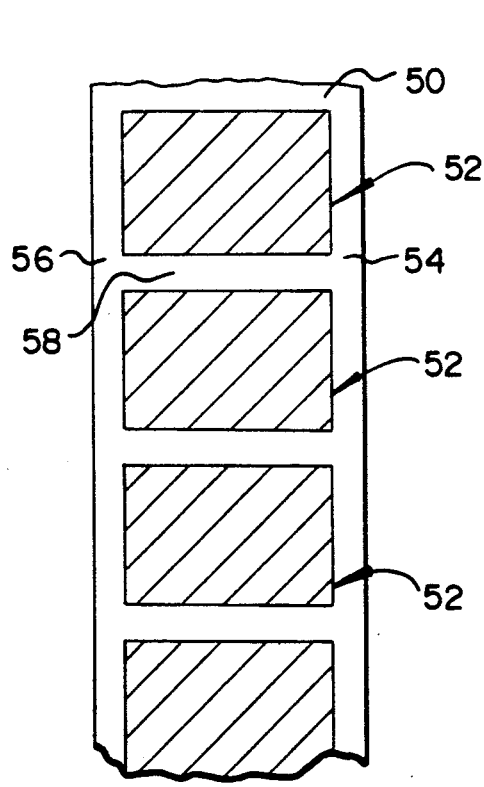 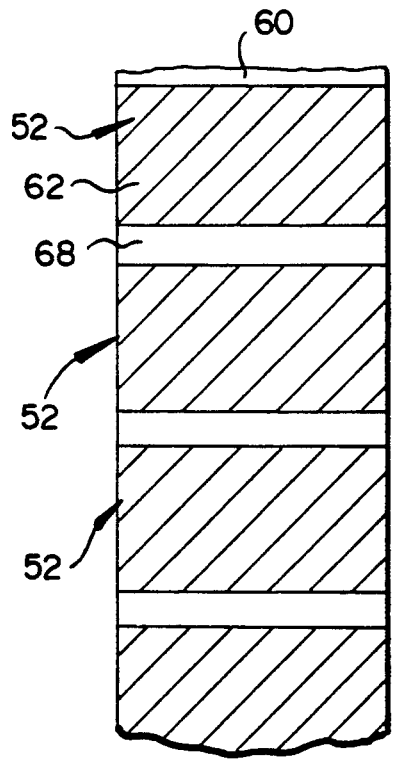
FIG. 5   FIG. 6

LAMINATED MULTILAYER FILM COMPOSITE AND HEAT SEALED BAG MADE THEREFROM

This invention is directed to multilayer laminated films and to articles made therefrom by techniques which include heat sealing. It more particularly refers to such multilayer laminates which are suited to be assembled into a bag or pouch having at least a portion which is closed by heat sealing.

BACKGROUND OF THE INVENTION

Multilayer laminated film form composite structures are well known in the plastics art. One wide spread use of these composite materials is to form them into bags or pouches adapted to hold granular material, such as for example rice or the like.

In this and other uses, it is often desirable to provide printing or other indicia for the ultimate package, that is the bag or pouch, on the film or films to be laminated together to form the composite film structure. It is obvious that the surfaces of the films, and anything disposed thereon, such as printing ink, or other indicia, are liable to be marred, either by abrasion with the contents of the package or by abrasion by contact with things which are external to the package, at least to the extent that such surfaces contact the bag contents.

Therefore, it is common practice to provide the printing on the surface of the film(s) which will be disposed between the laminated layers of composite film which makes up the package. This acts to protect the printing by interposing a film of plastic between the printing ink and the bag contents as well as between the printing ink and things external to the bag which might rub against the bag and thus damage the printed images.

In this use, where the printing for the package is disposed between the laminated layers of plastic film, as well as in other application, it has been found to be desirable that the layers of plastic film be laminated together by the use of an adhesive. Although other methods of lamination are known, and some are used commercially, this invention is primarily directed to improving the existing art of making heat seals in composite plastic film which has been adhesively laminated.

It is considered to be conventional practice to use, as the laminating adhesive, an adhesive ink. That is, it has been commercial practice in some cases to use as the ink for printing, a material which is also an adhesive for the plastic films which are being laminated to form the composite film from which the ultimate bag or pouch will be formed. The adhesives, whether combined with ink or not, may suitably be pressure sensitive adhesives, or heat sensitive adhesives or for that matter substantially any other plastic laminating adhesive. The particular adhesives which are used to produce the laminates of this invention are considered to be per se conventional.

In practice, in order to save money, the plastic films have been getting progressively thinner. This has placed a strain on the weight holding capacity of the bags made from these films. Sometimes, the failure is at the heat seals which convert the composite films into the bags. This has led to a careful consideration of the seals, which has led to this invention.

BROAD DESCRIPTION OF THE INVENTION

It is therefore an object of this invention to provide a laminated multi-film composite film form structure with improved heat sealing characteristics.

It is another object of this invention to provide a laminated multi-film structure, having ink printed matter on the surface of at least one of the films, which surface is directed toward the laminating interface, with improved heat sealing characteristics.

It is another object of this invention to provide an improved heat sealed structure of two layers of adhesively laminated composite plastic film.

It is a further object of this invention to provide an improved plastic film form bag structure which is made up of laminated composite films, suitably adhesively laminated composite films, which are heat sealed together to make up at least a part of the bag.

Other and additional objects of this invention will appear from a consideration of this entire specification, including the drawing hereof and the claims appended hereto.

In accord with and fulfilling these objects, one aspect of this invention resides in a bag or pouch structure comprising at least two films, at least one of which is a laminated multi-film composite structure, wherein the films are at least partially heat sealed together. According to this invention, the heat seal is remarkably improved by insuring the substantial absence of adhesive, ink or substantially any other incompatible substance on any of the surfaces of those portions of any of the plastic films which are included in the heat seal. When it is said that the bag or pouch structure of this invention comprises at least two films, it is intended to include a single laminated film, such as an adhesively laminated composite film, which has been folded, rolled or turned so as to heat seal different parts of it to itself.

Another aspect of this invention is a composite film comprising at least two layers which are laminated together but which has predefined areas having no incompatible adhesive, or other incompatible material, between the films or on any surface thereof.

A further aspect of this invention is an adhesively laminated composite film, or a bag or pouch made therefrom, which has ink printing disposed on one or more surfaces of the plastic films disposed between the layers of the laminated films, in addition to, or instead of, the adhesive, but which has at least one predefined area in which the layers of the composite film directly contact each other without the interposition of adhesive, ink or anything else therebetween, and wherein this predefined area is an area in which the composite film is, or is to be, heat sealed. Thus, despite the fact that the bag or pouch structure of this invention is made up of at least one laminated composite plastic film, the heat seal area in this bag or pouch structure contains substantially no incompatible material disposed within or between any of the layers of plastic which make up the heat seal.

BRIEF DESCRIPTION OF THE DRAWING

FIG. 3 is a side view of a fin type heat seal which is useful in this invention;

FIG. 4 is a side view of a lap type heat seal which is useful in this invention;

FIG. 5 is a plan view of one type of continuous run of laminated composite film.

FIG. 6 is a plan view of another type of continuous run of laminated composite film.

DETAILED DESCRIPTION OF THIS INVENTION

According to a preferred aspect of this invention, a laminated two-layer composite of plastic films is assembled so that the films are laminated together over a substantial portion of the common area thereof. In the case of an adhesively laminated composite film, the adhesive is preferably disposed over substantially all of the mating surface areas of the films being laminated, but specifically omitting the adhesive from selected, predefined areas of the films. In a preferred embodiment, the adhesive is omitted from the portion of the composite laminated film which is at the periphery thereof.

Figure 1:
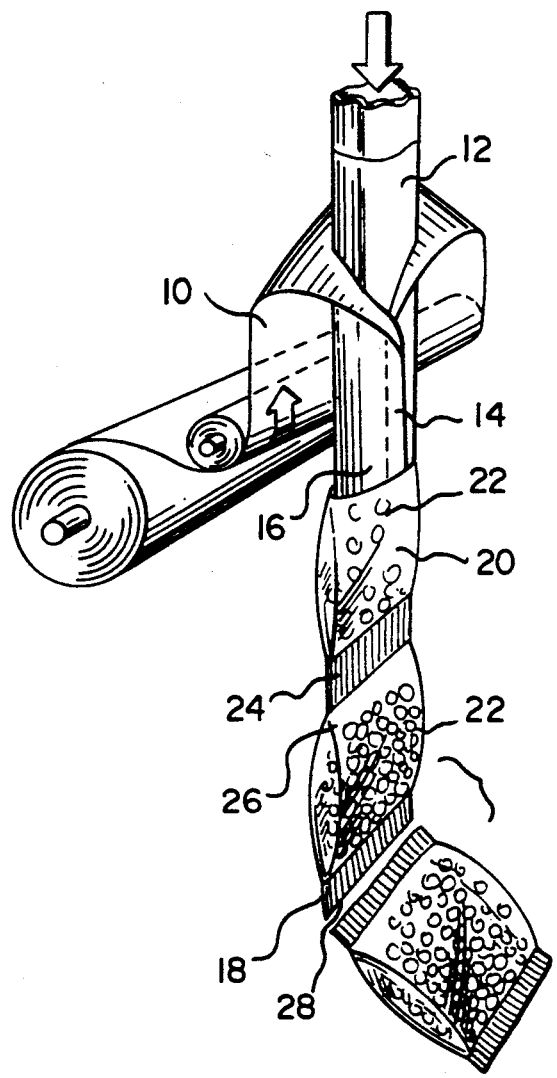
FIG. 1 is a perspective schematic view of a form and seal operation in which a single plastic film is folded on itself and sealed to simultaneously be formed into a bag structure while being filled with its intended contents.

Referring now to the drawing and specifically to FIG. 1 thereof, a fill and seal operation is shown, with the heat sealing bars and various drive roller pairs omitted for ease of view. In the depicted operation, a laminated composite plastic film 10 is shown being unwound from a previously prepared roll thereof and disposed about a mandril 12, which is itself a chute through which the bag which is being formed will be filled with desired product. It should be noted that as the film 10 is disposed about the mandril 12, it is suitably overlapped 14 and the overlapping portion is heat sealed to make a longitudinal tube 16.

As the longitudinally sealed tube 16 is drawn away from the mandril 12, it is transversely heat sealed 18 to make a pouch 20 which is simultaneously filled with product 22. When sufficient product has been inserted in the pouch, the tube is once again transversely heat sealed 24 which terminates the pouch into a sealed bag 26 and forms the seal to start another pouch. Thereafter, or in some cases simultaneously with the formation of the transverse heat seal, the fully sealed bag is separated from the line thereof by cutting 28.

Figure 2:
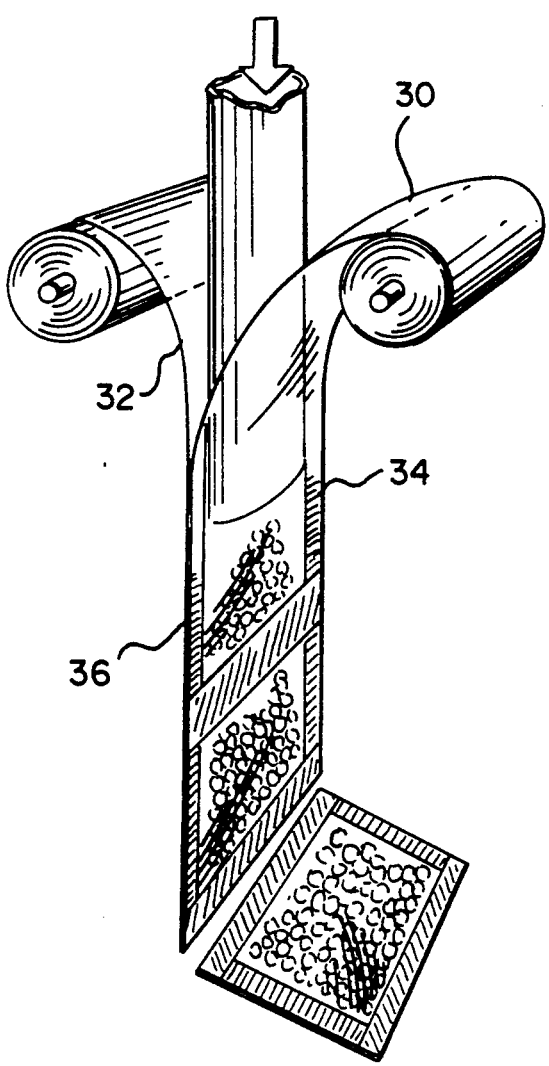
FIG. 2 is a perspective schematic view of a form and seal operation in which a two plies of plastic film are sealed together to simultaneously be formed into a bag structure while being filled with its intended contents.

Referring now to FIG. 2, a production line similar to the one shown in FIG. 1 is shown. The difference is that in FIG. 2, two (2) plastic films 30 and 32 are individually disposed over a mandril 12 and, instead of a single film being wrapped around the mandril and then longitudinally sealed to form a tube, in this embodiment, the two (2) films are side heat sealed 34 and 36 to form the tube 16a. The remainder of the operation is substantially the same as described with respect to FIG. 1.

Referring now to FIG. 3, there is shown a fin type heat seal which comprises two (2) plastic films 40 and 42 having ends 44 and 46 respectively, which are pinched together and heat sealed 48. The longitudinal heat seal shown in FIG. 1 might well be made in this manner.

In FIG. 4 the same two (2) plastic films 40 and 42 have their ends 44 and 46 overlapped and then heat sealed 49. Both types of heat seal are usable in many applications and are adapted to be improved by the practice of this invention.

Referring now to FIG. 5, there is shown a plan view of a laminated composite film in which a web of plastic 50 has deposited on discrete portions thereof a suitable laminating adhesive 52. Note that the laminating adhesive is not disposed along the longitudinal edges of the web 54 and 56 nor is it disposed at predetermined transverse intervals 58. There is positioned thereon a second web of plastic material disposed over this web 50 and adhesively laminated thereto only where the adhesive has been deposited.

Referring now to FIG. 6, there is shown a plan view of a laminated composite film in which a web of plastic 60 has deposited on discrete portions thereof a suitable laminating adhesive 62. Note that the laminating adhesive is not disposed along predetermined transverse intervals 68. There is positioned thereon a second web of plastic material disposed over this web 50 and adhesively laminated thereto only where the adhesive has been deposited.

Figure 7A:
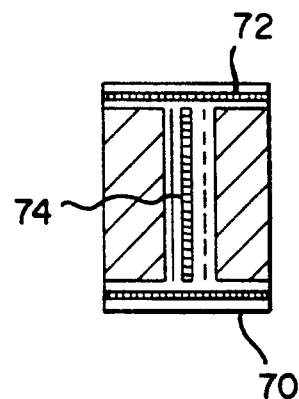
FIGS. 7a and b are a front and back view, respectively, of a bag made from the film shown in FIG. 5.
Figure 7B:
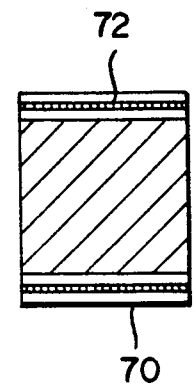
Figure 8A:
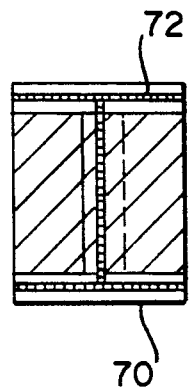
FIGS. 8a and b are a front and back view, respectively, of a bag made from the film shown in FIG. 6.
Figure 8B:
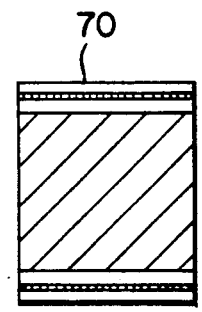

Referring now to FIGS. 7a and b, a bag is suitably made by using the process shown in FIG. 1 using the laminated composite film shown in FIG. 5 by folding the composite film upon itself and end sealing 70 and 72 the sides of the composite film together, and then longitudinally sealing 74 the film to itself. Note that FIG. 7a shows the back of the bag while FIG. 7b shows the front of the bag. FIGS. 8a and b are similar but show the production of a bag from the composite film of FIG. 6.

Figure 9:
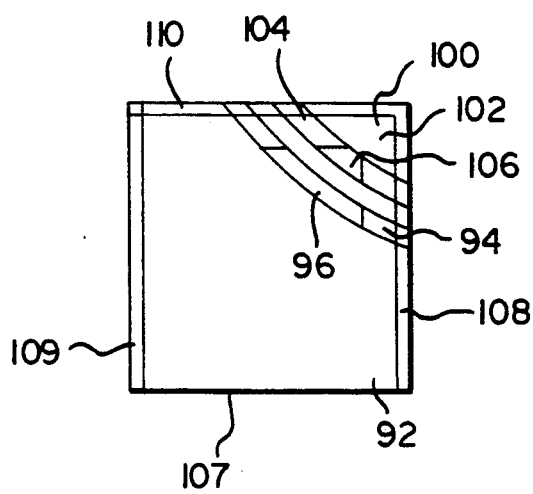
FIG. 9 is a partially sectioned plan view of a bag according to this invention made by heat sealing together composite plastic film materials.

Referring now to FIG. 9, there is shown the completed, filled bag having a top composite plastic film, which is made up of two (2) layers 92 and 94 of plastic film laminated together with adhesive 96. It also has a bottom composite film 100 made up of two (2) layers 102 and 104 of plastic film laminated together with adhesive 106.

The bag is completely sealed by a fold 107 in the composite plastic film from which it was made, two (2) longitudinal heat seals 108 and 109, and a transverse heat seal 110. Note should be taken of the fact that the adhesive material of the top and the bottom laminated composite films does not intrude into the areas where the heat seals have been made. Thus, the heat seals are of four (4) layers of plastic film having substantially nothing but plastic, that is substantially nothing incompatible, in them. In this way, it has been found, quite unexpectedly, that the heat seals are much stronger than they were when the adhesive material of the laminated plastic film layers extended to the very edges of the composite films and therefore into the heat seals themselves.

A single embodiment of this invention, where one composite, adhesively laminated film is folded upon itself to form a bag, has been shown. It will be clear that other similar structures of composite plastic films will enjoy the same advantages of this invention. Mention may be made of an embodiment where two separate and distinct adhesively laminated composite films are provided and then heat sealed to each other totally around the periphery thereof in order to construct a bag or pouch.

In this regard, it will be necessary to apply the laminating adhesive to only a portion of the surface of the plastic films for lamination. Thus a film with adhesive thereon would be suitable for use in this embodiment of this invention. The thus adhesively laminated first composite would then have another, substantially identical, second composite disposed thereover and all of the edges thereof heat sealed together in the areas where there was no laminating adhesive.

It is, of course, within the preview of this invention to provide other materials in between the layers of the composite film, such as ink for printing. It is known, as set forth above, to use a single material for the ink as well as the laminating adhesive, and, according to this invention, this too must be kept out of the heat seal areas.

It is recognised that operating in the fashion set forth herein may require that some additional care must be taken in order to insure that the areas of the adhesively laminated multi-layer composite film, which will become part of the heat seals of the bag of this invention, are free of incompatible material, such as adhesive or ink. However, if this is accomplished, experience has shown that the resulting heat seals will be much stronger than they would have been had they included such incompatible matter.

The specific plastic film form materials which are used to make up the adhesively laminated composite films of this invention are not critical. It is important that they be of a thermoplastic material so that they can be subjected to heat sealing. It is also important that they be made of materials which are substantially compatible with each other, in the sense that the adhesive which is used will properly adhere the different films together, and that heat sealing them will thermally adhere them together. It is probably desirable that, if different polymers are used for different film layers in the composite film, they have the same or quite similar melting ranges, and thermal decomposition conditions, so that one of the films is not thermally destroyed because of the heating necessary to thermally adhere it to the other.

Suitable polymers for use in this invention include for example: polyethylene, low density polyethylene, ethylene-vinyl acetate copolymer, linear low density polyethylene, polypropylene, high density polyethylene, Surlyn TM ionomers, ethylene-propylene, copolymers, polyethyl acrylate, polymethyl methacrylate, modified polyesters, polyethylene-acrylic acid, polyethylene methacrylic acid and mixtures and copolymers of these materials. Either or both of the laminated composite film can be single composition single films, or they can coextrudates of two or more layered compositions.

Adhesives for use in forming the laminated, multilayer composite of this invention are per se conventional. These are exemplified by such polymeric materials as: polyurethanes, epoxies, polyvinylidene chlorides, polyamides, acrylics, and ethylene-vinyl acetate copolymers. These adhesives are typically applied from a vehicle and then dried, and the film layers are bonded together by the typical application of pressure and heat as is well known in this art.

The heat seals to which this invention is directed may be made by any of the conventional techniques using for example a bar sealer, a hot wire, impulse sealing, a hot knife etc. Typically a cutting operation is often associated with the heat sealing operation so that both are accomplished simultaneously. This invention is particularly useful in the production of fin type heat seals. Lap seals, by their very geometry, or somewhat stronger than are fin seals. Thus, it is considered to be within the scope of this invention to produce a plastic bag as defined where only the fin seals thereof are made through substantially pure plastic with no incompatible material within the confines of the heat seal. It is within the scope of this invention for the bag to comprise fin seals as set forth above and lap heat seals in which the seal area may have adhesive or other incompatible material therein.

It is preferred in the practice of this invention to allow an area of up to about 1.5 to 2 inches in width where there in no laminating adhesive or other incompatible matter and in which the referred to heat seal will be placed. Of course it is desirable to make this open area as small as possible consistant with good seal making practice. Where the seal is made with a hot wire or a knife, and is therefore quite thin, the area in which no adhesive or other incompatible matter is disposed can be somewhat smaller and still retain a substantial safety margin.

SPECIFIC EXAMPLES OF THE PRACTICE OF THIS INVENTION

All of the examples were of vertical form, fill and seal packages. These packages are made by the practice which has been described in relation to FIG. 1. In this practice, the longitudinal seal was formed as a fin seal or as a lap seal as shown in FIGS. 3 and 4. The practice of this invention is suited to use in making the longitudinal as well as the transverse seals.

In each of the examples, seals were made with various different of film compositions, adhesives, and impulse heating settings. The impulse settings correspond to the amount of heat input used to make each seal. All of the heat seals were fin type end seals. In each case two adhesively laminated composite films of the same composition were heat sealed together. In the Examples marked "laminated" the adhesive extended into the heat seal area, whereas in the Examples marked "unlaminated" the adhesive was excluded from the heat seal area.

| FILM TYPE | EXAMPLE NO. | ADHESIVE TYPE | IMPULSE SETTING | TOUGHNESS |
| --- | --- | --- | --- | --- |
| #1 | 1. UNLAMINATED | ACRYLIC | 4 | 0.26 |
|  | LAMINATED | ACRYLIC | 4 | 0.08 |
|  | 2. UNLAMINATED | ACRYLIC | 6 | 0.18 |
|  | LAMINATED | ACRYLIC | 6 | 0.08 |
|  | 3. UNLAMINATED | ACRYLIC | 8 | 0.23 |
|  | LAMINATED | ACRYLIC | 8 | 0.10 |
| #2 | 4. UNLAMINATED | POLYETHYLENE IMINE | 5 | 0.43 |
|  | LAMINATED | POLYETHYLENE IMINE | 5 | 0.44 |
|  | 5. UNLAMINATED | POLYETHYLENE IMINE | 8 | 2.53 |
|  | LAMINATED | POLYETHYLENE IMINE | 8 | 0.43 |
| #3 | 6. UNLAMINATED | POLYETHYLENE IMINE | 5 | 2.01 |
|  | LAMINATED | POLYETHYLENE IMINE | 5 | 1.55 |

-continued

| FILM TYPE | EXAMPLE NO. | ADHESIVE TYPE | IMPULSE SETTING | TOUGHNESS |
| --- | --- | --- | --- | --- |
| #4 | 7. UNLAMINATED | POLYETHYLENE IMINE | 8 | 2.00 |
|  | LAMINATED | POLYETHYLENE IMINE | 8 | 0.82 |
|  | 8. UNLAMINATED | POLYETHYLENE IMINE | 5 | 1.59 |
|  | LAMINATED | POLYETHYLENE IMINE | 5 | 1.35 |
|  | 9. UNLAMINATED | POLYETHYLENE IMINE | 8 | 1.88 |
|  | LAMINATED | POLYETHYLENE IMINE | 8 | 1.17 |

Film type #1 was ethylene-vinyl acetate (EVA) with a 3.5% vinyl acetate content. The other films 2, 3 and 4, were all blends of 70% linear low density polyethylene and 30% ethylene-vinyl acetate content. In film type #3 the EVA had a 12% vinyl acetate content. In film type #4 the EVA had a 18% vinyl acetate content. Thus, each heat seal was made through four (4) layers of film each having the same composition, as above reported, and each being about 2.1 mils in thickness, make each composite film about 4¼ mils in thickness, including the adhesive.

What is claimed is:

1. A bag comprising at least two plastic films, at least one of which is a composite of at least two layers of plastic adhesively laminated together; and at least one area, in which the plastic films are heat sealed together, consisting essentially of plastic films having substantially no adhesive material therein or thereon.

2. The bag as claimed in claim 1 wherein said two plastic layers comprise a single plastic film folded on itself.

3. The bag as claimed in claim 1 having ink printed indicia between said plastic layers, but not in said heat seal areas.

4. The bag as claimed in claim 1 wherein said heat seal is a fin seal.

* * * * *